Nov. 20, 1945.     R. B. HITCHCOCK     2,389,510
BALING PRESS
Filed May 15, 1944
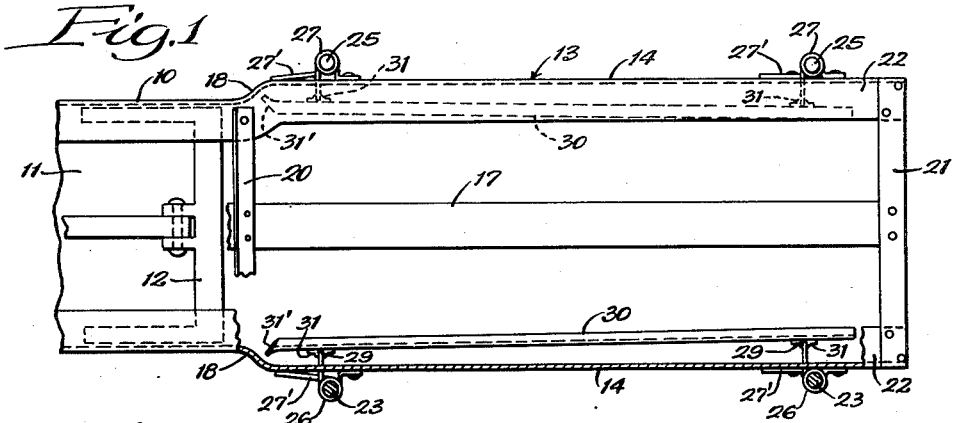
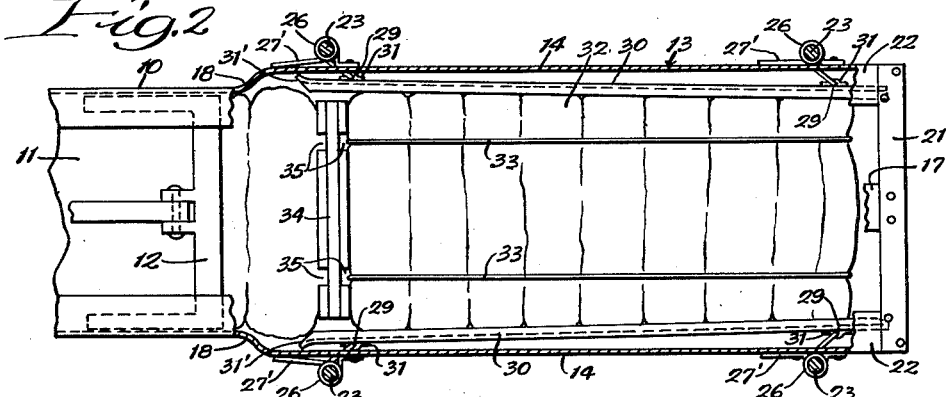
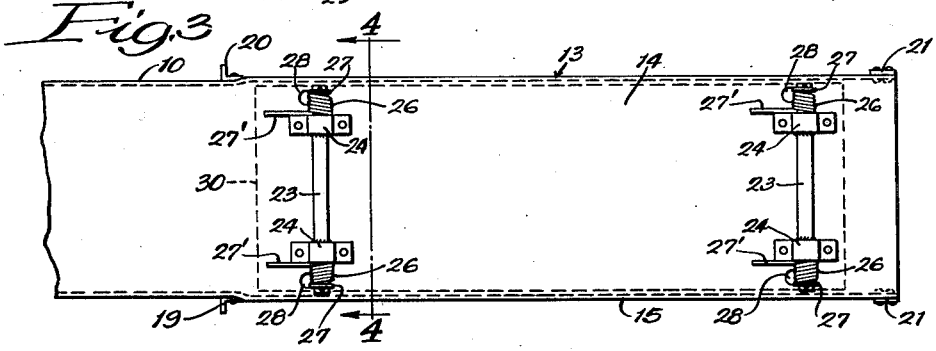
Inventor:
Rex B. Hitchcock,
By Paul O. Pippel
Attorney.

Patented Nov. 20, 1945

2,389,510

UNITED STATES PATENT OFFICE 2,389,510
BALING PRESS

Rex B. Hitchcock, Evanston, Ill., assignor to International Harvester Company, a corporation of New Jersey Application May 15, 1944, Serial No. 535,619

8 Claims. (Cl. 100—23)

This invention relates to baling presses. More specifically, it relates to compression control means for use in the baling chamber of a baling press. In the conventional hay press, such as shown in the Johnson and Younger Patent 1,159,948, means are usually provided for manually adjusting the restriction at the outlet end of the bale chamber in order to control the pressure in the bale chamber and the density or weight of the bales being made. As shown in said patent, in addition to manual adjusting means, the compression control devices often include resilient means whereby outward forces in the bale chamber act against resilient means to expand the bale chamber and to prevent the build-up of undue compression in the bale chamber and against the compression plunger.

The principal object of the present invention is to provide a baling chamber with improved compression control means. A further object is to provide compression control means acting automatically over a wide range of conditions in the type of material being baled and the moisture content thereof. A more specific object is to provide resiliently mounted compression means extending along two sides of the baling chamber.

The above objects and others which will be apparent are accomplished by a construction as illustrated in the drawing in which compression means are yieldingly mounted so as to move outwardly with the application of frictional forces in the direction of movement of the bale as well as with pressure exerted perpendicular to the direction of movement of the bale.

In the drawing,

Figure 1 is a diagrammatic plan view of a baling chamber with one side broken away in section;

Figure 2 is a view similar to Figure 1 with both sides broken away in section and with a bale in position to illustrate action on the compression control means;

Figure 3 is a side elevation of the structure shown in Figures 1 and 2;

Figure 4 is a section taken on the line 4—4 of Figure 3.

The drawing only diagrammatically illustrates a baling press which, for example, may be of the conventional hay-press type as shown in the patent above referred to. Any conventional means may be utilized for feeding the material to be baled to the feeding chamber and for operating the baling plunger. Also, any type of frame work may be used for supporting the baling chamber and the feed chamber in the desired position for operation.

The drawing illustrates a feed chamber 10, the upper portion being open at 11 for feeding material thereto. A baling plunger 12 is illustrated in position at the compression end of its stroke. It is to be understood that said plunger is reciprocated, the material being fed to the feeding chamber 10 between the cycles of operation of the plunger. A baling chamber, indicated in its entirety by the reference character 13, is shown as being an integral continuation of the feeding chamber 10. Figure 4 illustrates a cross section through the baling chamber showing side walls 14, a bottom structure 15 having slots 16 therein to provide for tying operations, and a longitudinal plate member 17 which acts to further confine the material being baled. The transverse dimension or width of the bale chamber—that is, the space between the side walls 14—is substantially greater than the corresponding width of the feeding chamber 10. As best shown in Figure 2, said chambers are connected by a curved wall 18 at each side. A lower angle bar member 19 and an upper angle bar member 20 connect the side walls of the feeding chamber and act also to secure the side walls of the baling chamber in position. Transverse upper and lower members 21 at the discharge end of the bale chamber secure the side walls in position at that end of the baling chamber. The upper portions of the side walls 14 are turned inwardly at right angles to form confining ledges 22 along the upper portion of the bale chamber. Said turned-in portions also reinforce the side walls by forming corners of substantial structural strength.

At each side of the bale chamber and at locations adjacent the forward and rear ends thereof, cylindrical supports 23 are vertically positioned, being rigidly mounted on the baling chamber by brackets 24 secured to the side walls 14. The brackets 24 are spaced from the ends of the said supports to provide circular extensions 25 on all of which coiled springs 26 are mounted, washers 27 being fitted over the springs to hold them in position. Each of the springs 26 has one tangential extension 27' abutting the adjacent portion of the side wall 14. The other end of each coil spring extends through an opening 28 in the side wall 14 and, in the neutral position of the compression plates and of the spring, projects substantially vertically to the side wall, as indicated in Figure 1. Each of the springs 26 is provided with a bent-over extension 29 within the bale chamber. The extensions 29 on the vertically aligned springs on each end are in alignment with each other. It will be understood, therefore, that there are four points of connection at each side of the bale chamber for each of the compression plates 30. The spring ends 29 are pivotally secured to the plates 30 by attaching brackets 31. In order to position the compression plates 30 at a slight angle with respect to the walls 14, the extensions 29 of the springs are longer at the discharge end of the bale chamber than at the inlet end. This inclination of the compression plates is predetermined to provide for the desired compression of the bale under normal conditions for most types of material to be baled.

After the baler is in operation with the baling chamber being filled, there is sufficient frictional engagement of the plates 30 with the material to provide the compression desired in the bale. As indicated in Figure 2, material is delivered upon each stroke of the plunger 12 to the inlet end of the baling chamber. The compression plates 30 are outwardly curved at the inlet end of the baling chamber, as indicated at 31', to permit entry of material to be baled. Figure 2 also indicates a completed bale 32 in position with baling ties 33 already secured around the bale. These ties, which are usually of wire, may be applied in any desirable way. A baling block 34, as is conventionally used with hay presses, is indicated in Figure 2, slots 35 being provided for inserting the ends of the baling ties. This baling block is illustrated only to better show the position of a bale and the action of the compression plates. Any type of bale separating means may be utilized and blocks may be entirely dispensed with, as is common practice in some of the balers being used at the present time.

As the material to be baled is fed to the baling chamber, the restriction at the outlet end progressively builds up pressure to the amount desired to compress the bale sufficiently for tying so that a bale of the desired weight and density will be obtained after the slack in the tying mechanism has been taken up upon discharge of the bale. As the force obtained by the restriction means is due not only to the restriction in a transverse direction, but also to the frictional engagement of the material being baled with the sides of the bale chamber, it will be understood that different coefficiency of friction of the material being baled very materially affects the total compression obtained. It is primarily to take care of this variation that the construction of this invention was devised.

The surface frictional forces acting on the plates 30 tend to drag the plates forwardly with the bale. The construction of the invention provides for a certain amount of movement of the plates 30 in the direction of the bale movement. Movement in said direction, however, as shown by a comparison of Figures 1 and 2, simultaneously moves the plates outwardly, thereby increasing the width of the bale chamber and decreasing the compressive force. By this means, there is an automatic control on the bale compression as material being baled, particularly hay, direct from the field, varies in moisture content and in the resulting co-efficient of friction with the walls of the bale chamber. It is very desirable to have an automatic compression controlling means as provided by the pressure plates 30 when operating as described.

The compression controlling means as above described may be utilized in conjunction with the conventional hand controlling means as provided with hay presses, the automatic controlling being effective to take care of a major portion of the variations in the friction properties of the material being baled without resorting to the manually controlled means.

It is also to be understood that applicant claims as his invention all applications of the compression control means above described and set forth which fall within the scope of the appended claims.

What is claimed is:

1. A baling chamber construction for balers in which the material is fed through a chamber under compression and tied while under compression, comprising a feed chamber having a feed opening thereto and a plunger reciprocable therein, a baling chamber in alignment with the feed chamber, said baling chamber being larger in one transverse direction than the feed chamber and having side walls in said direction spaced outwardly from the corresponding side walls of the feed chamber, bale-engaging members mounted in the bale chamber spaced from said side walls, yieldable means for holding said members in position and for permitting the members to move forwardly and simultaneously outwardly to relieve compression on the bale upon the exertion of force thereagainst.

2. A baling chamber construction for balers in which the material is fed through a chamber under compression and tied while under compression, comprising a feed chamber having a feed opening thereto and a plunger reciprocable therein, a baling chamber in alignment with the feed chamber, said baling chamber being larger in one transverse direction than the feed chamber and having side walls in said direction spaced outwardly from the corresponding side walls of the feed chamber, bale-engaging members mounted in the bale chamber spaced from said side walls, said members being inclined towards each other in the direction of bale movement, yieldable means for holding said members in position and for permitting the members to move forwardly and simultaneously outwardly to relieve compression on the bale upon the exertion of force thereagainst.

3. A baling chamber construction for balers in which the material is fed through a chamber under compression and tied while under compression, comprising a rectangular feed chamber having a feed opening thereto and a plunger reciprocable therein, a baling chamber formed as an extension of the feed chamber, said baling chamber being larger in one transverse direction than the feed chamber and having parallel side walls in said direction spaced outwardly from the corresponding side walls of the feed chamber, bale-engaging plates mounted in the bale chamber spaced inwardly from said side walls, said plates being spaced farther apart at the material-receiving end than at the discharge end, yieldable means for holding said plates in position and for permitting the plates to move forwardly and simultaneously outwardly to relieve compression on the bale upon the exertion of frictional force thereagainst in a bale discharge direction.

4. A baling chamber construction for balers in which the material is fed through a chamber under compression and tied while under compression, comprising a rectangular feed chamber having a feed opening therein and a plunger reciprocable therein, a baling chamber formed as an extension of the feed chamber, said baling chamber being larger in one transverse direction than the feed chamber and having parallel side walls in said direction spaced outwardly from the corresponding side walls of the feed chamber, bale-engaging means comprising plates mounted in the bale chamber spaced from said side walls, yieldable means for holding said plates in position and for permitting the plates to move forwardly and simultaneously outwardly to relieve compression on the bale upon the exertion of frictional force thereagainst in a bale discharge direction, said plates having outwardly curved ends adjacent the feed chamber and being inclined inwardly toward their bale discharge ends.

5. A baling chamber construction for balers in which the material is fed through a chamber under compression and tied while under compression, comprising a rectangular feed chamber having a feed opening therein and a plunger reciprocable therein, a baling chamber formed as an extension of the feed chamber, said baling chamber being larger in one transverse direction than the feed chamber and having parallel side walls in said direction spaced outwardly from the corresponding side walls of the feed chamber, bale-engaging compression plates mounted in the bale chamber spaced from said side walls, resilient means for holding said plates in position and for permitting the plates to move forwardly and simultaneously outwardly to relieve compression on the bale upon the exertion of frictional force in a bale discharge direction thereagainst, said plates having outwardly curved ends adjacent the feed chamber and being inclined inwardly toward their bale-discharge ends, said resilient means including springs anchored to the bale chamber at one end, the other ends of said springs being substantially at right angles to the compression plates in their neutral position, said spring ends being connected to the compression plates, the direction of extension of the springs within the bale chamber providing for the outward movement and separation of the plates when frictional forces are applied to the bale contacting surfaces thereon.

6. A baling chamber construction for balers in which the material is fed through a chamber under compression and tied while under compression, comprising a rectangular feed chamber having a feed opening therein and a plunger reciprocable therein, a baling chamber formed as an extension of the feed chamber, said baling chamber being larger in one transverse direction than the feed chamber and having parallel side walls in said direction spaced outwardly from the corresponding side walls of the feed chamber, bale-engaging compression plates mounted in the bale chamber spaced from said side walls, yieldable means for holding said plates in position and for permitting the plates to move forwardly and simultaneously outwardly to relieve compression on the bale upon the exertion of frictional force thereagainst in a bale discharge direction, said plates having outwardly curved ends adjacent the feed chamber and being inclined inwardly toward their bale discharge ends, said yieldable means comprising coiled springs mounted in spaced relation on the bale chamber and one end of each spring being anchored thereto, the other ends of said springs extending through the side walls of the bale chamber substantially at right angles to the compression plates in their neutral position, said spring ends being pivotally connected to the compression plates, the direction of extension of the springs within the bale chamber providing for the outward movement of the plates when frictional forces are applied to the bale contacting surfaces thereon.

7. A baling chamber construction for balers in which the material is fed through a chamber under compression and tied while under compression, comprising a rectangular feed chamber having a feed opening therein and a plunger reciprocable therein, a baling chamber formed as an extension of the feed chamber, said baling chamber being larger in one transverse direction than the feed chamber and having parallel side walls in said direction spaced outwardly from the corresponding side walls of the feed chamber, bale-engaging compression plates mounted in the bale chamber spaced from said side walls, yieldable means for holding said plates in position and for permitting the plates to move forwardly and simultaneously outwardly to relieve compression on the bale upon the exertion of frictional force in a bale discharge direction thereagainst, said plates having outwardly curved ends adjacent the feed chamber and being inclined inwardly toward their bale discharge ends, said yieldable means comprising supports mounted at each end of each plate outside the bale chamber, coiled springs mounted in spaced relation on said supports and being anchored to the bale chamber at one end, the other ends of said springs extending through the side walls of the bale chamber substantially at right angles to the compression plates in their neutral position, said spring ends being pivotally connected to the compression plates, the direction of extension of the springs within the bale chamber providing for the outward movement and separation of the plates when frictional forces are applied to the bale contacting surfaces thereon.

8. A baling chamber construction for balers in which the material is fed through a chamber under compression and tied while under compression, comprising a rectangular feed chamber having a feed opening therein and a plunger reciprocable therein, a baling chamber formed as an extension of the feed chamber, said baling chamber being larger in one transverse direction than the feed chamber and having parallel side walls in said direction spaced outwardly from the corresponding side walls of the feed chamber, bale-engaging compression plates mounted in the bale chamber spaced from said side walls, yieldable means for holding said plates in position and for permitting the plates to move forwardly and simultaneously outwardly to relieve compression on the bale upon the exertion of frictional force in a bale discharge direction thereagainst, said plates having outwardly curved ends adjacent the feed chamber and being inclined inwardly toward their bale discharge ends, said yieldable means comprising circular supports mounted at each end of each plate outside the bale chamber, coiled springs mounted in spaced relation on said supports and being anchored to the bale chamber at one end, the other ends of said springs extending through the side walls of the bale chamber substantially at right angles to the compression plates in their neutral position, said spring ends being pivotally connected to the compression plates on axes parallel to the circular supports, the direction of extension of the springs within the bale chamber providing for the outward movement and separation of the plates when frictional forces are applied to the bale contacting surfaces thereon.

REX B. HITCHCOCK.